United States Patent Office 2,880,161
Patented Mar. 31, 1959

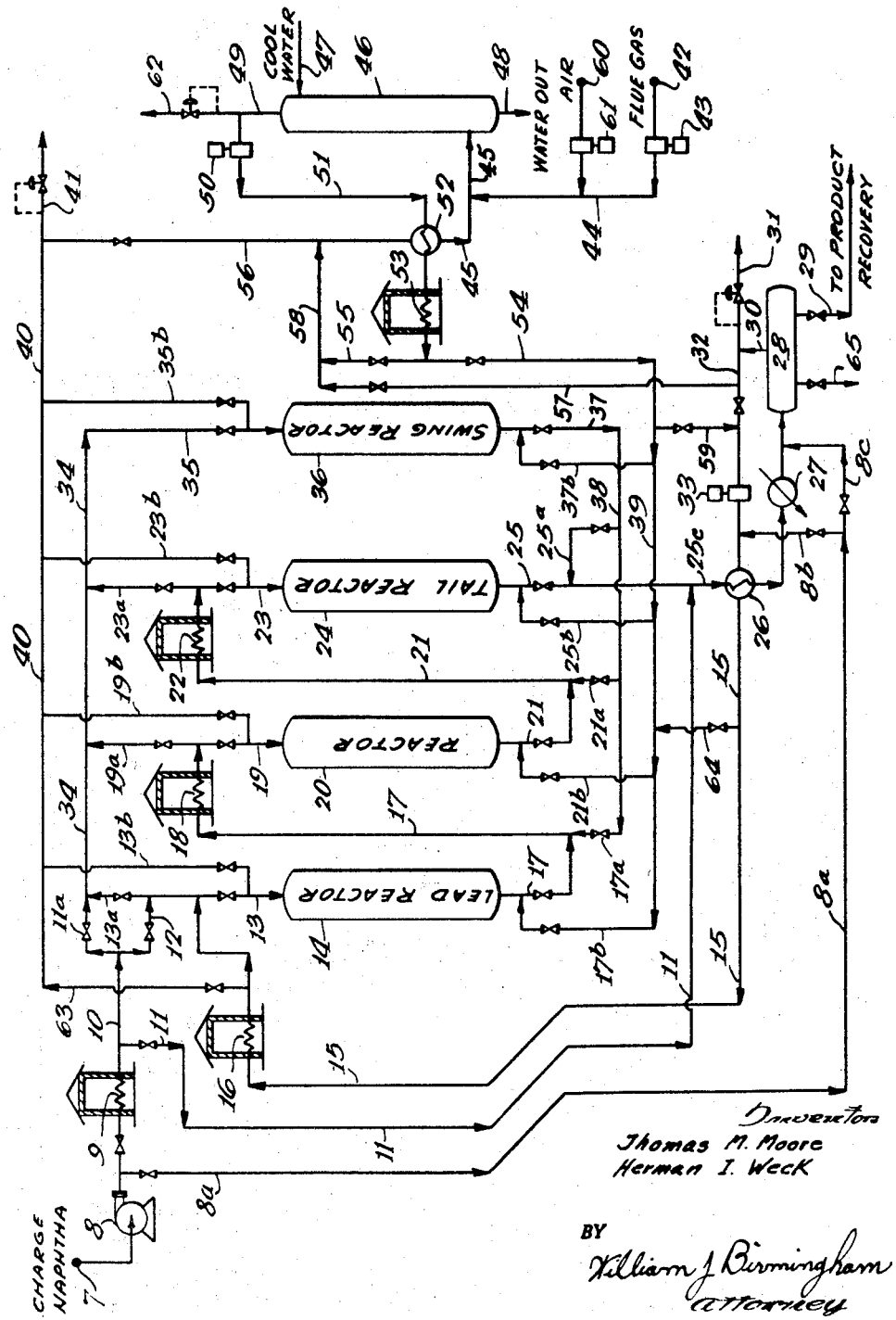

2,880,161

START-UP OF REGENERATIVE PLATINUM CATALYST HYDROFORMING SYSTEMS

Thomas M. Moore, Munster, and Herman I. Weck, Dyer, Ind., assignors to Standard Oil Company, Chicago, Ill., a corporation of Indiana Application June 22, 1956, Serial No. 594,077

10 Claims. (Cl. 208—65)

This invention relates to an improved start-up procedure for a regenerative platinum catalyst hydroforming system, and it pertains more particularly to a method for integrating regeneration facilities with the reaction system so as to produce and purify the start-up gas.

Compared with molybdenum catalyst hydroforming systems, the start-up of a platinum catalyst hydroformer is a comparatively delicate operation. Heretofore, it has been considered essential to employ extraneous sources of start-up gas, such as, bottled hydrogen, bottled nitrogen or normally gaseous hydrocarbons, e.g. natural gas. These gases must be substantially free of carbon oxides and water which quickly deactivate platinum catalyst under hydroforming conditions. Even when the extraneous start-up gas is free of carbon oxides and water, repeated purging and evacuation of the reactors with start-up gas are necessary because of surprisingly extensive contamination of the start-up gases with carbon oxides and water desorbed from the platinum catalyst. Such procedures are, of course, troublesome and expensive. An object of this invention is to provide a start-up procedure for regenerative platinum catalyst hydroforming systems, as exemplified by Ultraforming, which does not require the use of extraneous start-up gases and which, at the same time, does not require installation of additional equipment. A further object is to provide a start-up procedure which does not require repeated purging and evacuation of the reactors with start-up gases prior to on-stream operation and which, at the same time, does not cause significant catalyst deactivation. A further object is to provide a start-up procedure which will minimize loss of promoter components from the catalyst and will minimize corrosion problems. Another object is to provide a start-up procedure which will avoid formation of heat-fronts or hot-spots during initial periods of on-stream operation. Other objects will be apparent as the detailed description of the invention proceeds.

A regenerative platinum catalyst hydroforming system, as exemplified by Ultraforming (Petroleum Engineer, vol. XXVI, No. 4, April 1954, at page C-35), includes a reaction side comprising lead, intermediate, and tail reactors, heating zones prior to each of these reactors, a gas separation zone after the reactors, and compressor and lines for recycling separated gas. In addition, the system includes a regeneration side comprising a flue gas source, a scrubbing or contacting zone, such as a water spray tower, whereby water is removed from regeneration gases, a circulator and lines whereby flue gas may be circulated through the scrubbing zone, and valved lines for connecting the regeneration side to the reaction side. Usually the regeneration side is connected to the reaction side only during regeneration of a reactor. In practicing our invention, however, regeneration facilities are integrated with the reaction side during start-up, and a suitable start-up gas, i.e. substantially pure nitrogen, is obtained internally by removing in the regeneration scrubbing zone the carbon oxides and water normally present in flue gas from the flue gas source and the carbon oxides and water desorbed from platinum catalyst and reactor linings during initial heating. At the same time sulfur compounds present in the flue gas are minimized. When substantially pure nitrogen is obtained, regeneration facilities are isolated from the reaction side, which is then brought on-stream in a manner which minimizes catalyst deactivation, as hereinafter described in detail.

To start-up a unit in accordance with our invention, a supported platinum catalyst is charged to each of the reactors and the entire system is then purged with flue gas, introduced from the flue gas source, at about atmospheric pressure e.g. 5–10 p.s.i.g., at a temperature below about 200° F. The system is then pressured to at least the desired operating pressure to check for possible leaks. After pressure testing, flue gas is circulated continuously, preferably at the full operating pressure, between the reaction side and the regeneration side so that water and carbon oxides are removed therefrom in the scrubbing zone. While the flue gas is being circulated, it is gradually heated to at least about 450° to 500° F., at which catalyst bed temperature essentially all carbon oxides will have been desorbed from the platinum catalyst.

Circulation of the flue gas continues until the carbon oxides content is reduced below about 1 mol percent, preferably below about 0.5 mol percent. The scrubbing or contacting medium for removing carbon oxides is preferably water. Other suitable contacting media include mono-, di-, and tri-ethanol amines, potassium phosphate, potassium carbonate, activated charcoal, zeolites, and other materials capable of removing carbon oxides. The time required for reducing carbon oxides to desired levels depends on many factors, including, in the case of water as the contacting medium, temperature of the water, concentration of carbon oxides, pressure, efficiency of contact, and relative volume of water as compared with the volume of gases being contacted. Gas absorption data for carbon oxides in water are presented in the Chemical Engineers' Handbook, third edition, McGraw-Hill, page 674. Suitable chemicals may be included in the scrubbing medium to increase solubility of carbon oxides therein. For instance, when using water as the scrubbing medium, potassium hydroxide or sodium hydroxide may be added. Water removal by condensation as, for instance, in a water spray tower operating at 100° F., is accomplished in only a small fraction of the time required for reducing the content of carbon oxides. In a typical commercial Ultraforming system it has been found that flue gas must be circulated through the regeneration-side water spray tower in excess of about 6 hours to reduce the carbon oxides content of the flue gas from about 14% to less than 1.0%. This is no disadvantage inasmuch as a typical commerical Ultraformer can not be brought up to desired operating temperatures in less than about 24 hours.

While essentially all carbon oxides are desorbed from catalyst beds and reactor linings at about 450° to 500° F., water release is still substantial until about 700° to 800° F. Further circulation of the gases between reaction and regeneration sides may thus continue until bed and reactor lining temperatures reach about 700° to 800° F. while the water content of circulating gases is maintained below about 5 mol percent, preferably below about 1 mol percent. Advantageously, however, the reaction side may be isolated from the regeneration facilities when temperature of the catalyst beds reaches about 450° to 500° F. and the carbon oxide concentration is reduced to the desired level, i.e. below about 1 mol percent. Scrubbed flue gas in the reaction side may then be recycled while being further heated to about 700° to 800° F. These gases, leaving the tail reactor, may be cooled to about 100° F. and condensed water removed in the gas separation zone. The amount of water in the gas circulating through the catalyst beds should be below 5 mol percent and preferably below 1 mol percent. Aqueous condensate thus removed may be corrosive and it should be withdrawn before it comes in contact with the circulating compressor.

When the catalyst beds have been heated to about 700° to 800° F. by the circulating nitrogen stream and substantially all water has been removed from the system and when the pressure in the system is substantially below 200 p.s.i.g., naphtha charge may be slowly introduced. The catalyst bed in either the swing reactor or one of the regular reactors may be raised to a somewhat higher temperature of about 750° to 800° F., usually not higher than about 800° F., while the remaining reactors may be maintained at a somewhat lower temperature of about 700° to 750° F. A preferred operation is to connect the swing reactor in tail reactor position so that while substantially pure nitrogen is being circulated in the rest of the system, naphtha preheated to about 750° to 800° F. is introduced directly into the swing reactor and the effluent therefrom is discharged directly through heat exchangers to the hydrogen separator. The hydrogen thus formed in the swing reactor is recycled through the whole system and its concentration in the recycled gas rapidly reaches 80 percent or more. When the hydrogen pressure reaches the desired level, e.g. about 200 p.s.i.g., or more, the incoming naphtha charge at about 800° F. transfer line temperature is cut into the first reactor for on-stream flow through regular on-stream reheaters and reactors. The catalyst in the on-stream reactors is thus protected by hydrogen initially generated in the swing reactor. As soon as the system is brought to the desired pressure of operation, e.g. about 300 p.s.i., the temperature of the initial heater and reheaters is increased from about 800° F. to about 850° F., e.g. about 900° F., and the system is thus gradually brought to on-stream operating conditions.

By initially operating at relatively low hydrogen partial pressure, i.e. about 200 p.s.i. or lower, and relatively low temperature, i.e. not more than about 800° F., any tendency toward formation of run-away heat-fronts or hot-spots due, apparently, to hydrocracking is minimized. Any carbon deposited on the catalyst during initial generation of hydrogen is limited to the catalyst in the swing reactor since hydrogen produced in the swing reactor will be adequate to prevent appreciable carbon formation in the remaining reactors when charge is introduced thereto. The swing reactor may then be cut out of the system, the catalyst therein may be regenerated, if needed, and the other reactors will remain on-stream without necessity for regeneration for a much longer period of time than would otherwise be possible.

By integrating regeneration and reaction facilities during start-up, the inconvenience and expense of extraneous sources of start-up gas are avoided. Moreover, no additional equipment is required. By using scrubbed flue gas, i.e. nitrogen, for drying the system and establishing circulation and initial preheating conditions, catalyst activity is protected. In addition, scrubbing of the circulating gases while heating assures removal of desorbed carbon oxides prior to reaching hydroforming conditions. At one time carbon dioxide was not considered deleterious to platinum catalyst. It has recently been discovered, however, that while carbon dioxide itself does not significantly deactivate the catalyst, as soon as carbon dioxide contacts hydrogen in the presence of platinum catalyst it is reduced to carbon monoxide which does poison the catalyst. During flue gas purges the catalyst and reactor linings adsorb considerable carbon dioxide. The surprising importance of removing this adsorbed contaminant has been pointed up dramatically by commercial experience. For instance, it has been found that an essentially pure start-up gas became contaminated with about 5 to 10 percent carbon oxides which were desorbed from platinum catalyst during heating. Attempted start-up under such conditions resulted in complete failure and deactivation of all catalyst beds.

It is important that all oxygen be purged from the system before hydrocarbon gas is introduced because platinum catalyzes combustion even at relatively low temperatures. By maintaining the moisture content of circulating gases below about 5 mol percent, loss of promotor components of the catalyst is minimized. By initiating the introduction of charging stock at low temperature and low pressure, carbon formation on the catalyst is reduced. Start-up temperatures in the range of 700° to 800° F. are preferable and by operating with one of the reactors at a higher temperature, i.e. 750° to 800° F., than the remaining reactors, any carbon deposition can be largely restricted to the higher temperature reactor. As soon as desired high hydrogen content of recycle gases and operating pressures has been established, the reactor which was initially at high temperature may be cut out of the system, and the catalyst therein may be regenerated while the remaining reactors continue in on-stream operation.

The invention will be more clearly understood by reference to the following example read in conjunction with the accompanying drawing which is a schematic flow diagram of an Ultraforming system in which our start-up procedure is particularly advantageous.

In normal operation of an Ultraforming system a naphtha charge such, for example, as the 150 to 360° F. fraction of a Mid-Continent virgin naphtha is introduced from source 7 by pump 8 through preheater 9 and transfer line 10 from which the preheated charge may be by-passed by line 11 to the product recovery system during start-up procedure. In on-stream operation transfer line 10 will discharge through lines 12 and 13 to reactor 14 along with recycled hydrogen from line 15 which is preheated in heater 16. Effluent from reactor 14 passes through line 17, reheater 18, and transfer line 19 to reactor 20. Effluent from reactor 20 passes through line 21, reheater 22, and transfer line 23 to tail reactor 24. It should be understood that more than three reheater-reactor stages may be employed in the system.

Effluent from the tail reactor flows through lines 25 and 25c, heat exchanger 26 and cooler 27 to separator 28 from which hydroformed product is withdrawn through line 29 to a stabilizer and/or conventional product recovery system. A part of the hydrogen withdrawn from the separator through line 30 may be vented through line 31 but usually about 1,000 to 10,000 cubic feet per barrel of charge is recycled through line 32 by means of circulating compressor 33 to line 15.

Transfer lines 11a, 13a, 19a, and 23a may be selectively connected to header 34 for discharging through line 35 to swing reactor 36, the effluent from which passes through line 37 to header 38 and thence through line 17a to line 17, line 21a to line 21, or line 25a to line 25. During normal on-stream operation without the swing reactor the valves in lines 11, 11a, 13a, 13b, 17a, 17b, 19a, 19b, 21a, 21b, 23a, 23b, 25a and 25b remain closed and the valves in lines 12, 13, 17, 19, 21, 23 and 25 remain open.

The swing reactor may be substituted for the lead reactor by opening valves in line 13a, 35, 37 and 17a and closing valves in lines 13 and 17. Alternatively, it may be substituted for intermediate reactor 20 by opening valves in lines 19a, 35, 37 and 21a and closing the valves in lines 19 and 21. The swing reactor may take the place of the tail reactor by opening valves in lines 25a, 35, 37 and 25a and closing valves in lines 23 and 25. It will thus be seen that each of the reactors may be taken off-stream for regeneration and replaced by the swing reactor and that, alternatively, the swing reactor may be connected to operate in parallel with any of the other on-stream reactors during periods when no regeneration is required.

In some Ultraforming systems the hydrogen-rich recycle gas and the naphtha charge are heated in the same preheater. In such systems the charge introduced by pump 8 may be introduced by lines 8a and 8b to line 15 just ahead of heat exchanger 26 during normal operation and may be introduced by line 8a and line 8c to the line entering separator 28 during start-up.

Each of the reactors is provided with a refractory lining of low iron content, and metal surfaces may preferably be aluminized. They may each contain about the same amount of catalyst although, if desired, the subsequent reactors may contain somewhat more catalyst than the initial reactors. The catalyst may be of any known type of supported platinum catalyst, and the platinum is preferably supported on alumina; it may be prepared by compositing a platinum chloride with an alumina support as described, for example, in U.S. Patent 2,659,701, and it preferably contains about .3 to .6 weight percent of platinum.

The on-stream pressure is usually below about 400 p.s.i.g., i.e. in the range of 200 to 350 p.s.i.g. The inlet temperatures to each reactor are usually in the range of about 850 to 1000° F., e.g. about 920° F., and may be approximately the same for each reactor although it is sometimes desirable to employ somewhat lower inlet temperature to the initial reactor than to the remaining reactors. The overall weight space velocity may be in the range of about 1 to 4 pounds of naphtha per pound of catalyst per hour. There is, of course, a pressure drop in the system so that the lead reactor may operate at about 50 to 100 p.s.i. higher pressure than the tail reactor.

Prior to regeneration hot hydrogen-rich gas for stripping hydrocarbons from catalyst in a blocked-out reactor may be introduced by line 63 to manifold line 40 and thence through one of lines 13b, 19b, 23b, or 35b to the selected reactor. Also, hydrogen-rich gas may be introduced from line 15 to manifold line 39 by line 64.

For effecting purging and regeneration of the catalyst in any bed, purge gases and regeneration gases may be introduced through manifold line 39 and a selected one of lines 17b, 21b, 25b and 37b. Such purge and regeneration gases may be selectively withdrawn through lines 13b, 19b, 23b and 35b to manifold line 40 from which gases may be vented or flared through line 41. Purge and regeneration gases from manifold line 39 may be introduced to the inlet of circulating compressor 33 by line 59.

Flue gas from source 42, which typically contains about 9 to 12 percent carbon oxides, about 18 to 14 percent water and about 73 to 74 percent nitrogen, may be introduced to the system by compressor 43 and passed by lines 44 and 45 through a scrubber 46 which is preferably a scrubbing tower into which cool water is introduced through line 47 and from which water is withdrawn through line 48. The scrubbed flue gas withdrawn from the top of the tower through line 49 is passed by compressor 50 through line 51, heat exchanger 52, heater 53, and line 54 to manifold line 39 when it is desired to introduce flue gas into the system for purging and/or regeneration. By closing the valve in line 54 and opening the valve in line 55, the flue gas may be recirculated through lines 58 and 56, heat exchanger 52 and line 45 back to the scrubber. Air may be introduced from source 60 by compressor 61 for effecting regeneration and/or regeneration-rejuvenation of the catalyst. Excess flue gas may be vented from the system by line 62.

In starting up this system in accordance with our invention the entire system is, of course, first checked for mechanical defects, cleaned out, dried, and the reactors are charged with catalyst. A layer of alumina balls is preferably placed on top of each of the catalyst beds to prevent swirling of the catalyst pellets which might otherwise lead to abrasion and production of catalyst fines. Flue gas from source 42 is next introduced into the system and passed via 43, 44, 45, 46, 49, 50, 51, 52, 53, 54, 39 and 59 to the inlet of circulating compressor 33; and it is thereafter passed through all of the heaters, transfer lines and reactors to remove all air therefrom, the air and flue gas being at this time purged from the system through line 31. The temperature of the flue gas during this purge should be below 200° F. and the pressure is preferably about atmospheric, i.e. about 5 to 10 p.s.i.g.

After the initial flue gas purge, valve in line 31 is closed and the system is pressured with flue gas to at least the desired operating pressure, e. g. to about 350 p.s.i.g., to check for leaks. After pressure testing, the valve in line 31 is preferably then set to hold back the full operating pressure, e.g. 350 p.s.i.g., the valve in line 57 is opened, and the flue gas is continuously circulated through all the reactors, in series or parallel, preferably series, and back through the water spray tower 46 via 25c, 26, 27, 28, 30, 32, 57, 58, 56, 52 and 45. The scrubbed flue gas from the water spray tower 46 is returned to the reactors via 49, 50, 51, 52, 53, 54, 39, 59, 33, 15, 16 and 13. The swing reactor is preferably connected in parallel with the tail reactor at this time.

The temperature of the circulating flue gas is increased by gradually firing the furnaces to supply heat through heaters 16, 18, 22 and 53. Full operating pressure during this circulation step is preferred to assure sufficient circulation through furnaces and thereby avoid overheated tubes. The hot circulating gas effects drying of the catalyst and any further drying of the reactor linings that may be required. At the same time carbon oxides adsorbed on the platinum catalyst and linings are desorbed into the circulating gases. Carbon oxides initially present in the flue gas and carbon oxides desorbed from the catalyst and linings are scrubbed from the circulating gases as they pass through water spray tower 46. Water in the circulating gases is condensed in water spray tower 46 and thus removed from the system via line 48. Water is also separated from the circulating gases by condensation in cooler 27 and separated in separator 28 from which it may be withdrawn therefrom through line 65, the valve in line 29 being closed at this time. The heating up of a reactor should be sufficiently slow up to about 300° F. so that the gas will not pick up more than 5 mol percent water. After this initial drying step the temperature may be increased more rapidly to about 700° to 750° F., and circulation continued at this temperature until the carbon oxides content is reduced below about 1 mol percent, preferably below about 0.5 mol percent and the water content is reduced below 5 mol percent, preferably 1 mol percent. Until operating experience indicates the time required to reach these levels with any particular system, the carbon oxides content may be determined by Orsat analysis. Water content is usually at satisfactory minimum levels when no further appreciable amounts of water are removed from gas separation zone 28 via line 65. After removal of the carbon oxides and water, the hot circulating gas is essentially pure nitrogen, i.e. more than 99% nitrogen. The regeneration side may then be isolated from the reaction side by closing valves in lines 54 and 57 and opening valves in lines 55 and 32.

Since adsorbed carbon oxides are usually completely desorbed by the time catalyst bed temperatures are increased to about 450° to 500° F., the regeneration side may alternatively be isolated from the reaction side at this temperature level as soon as carbon oxides content of the circulating gas is reduced below 1 mol percent, preferably 0.5 mol percent. Temperatures may then be increased to about 700° to 750° F., and gas recycled around the reaction side until no further appreciable amounts of water are removed from gas separation zone 28 via line 65.

With essentially pure nitrogen being recycled through the reaction side, the valve in line 65 is closed and the valve in line 29 is opened. Naphtha preheater 9 is fired and charge naphtha preheated to about 800° F. is introduced through by-pass line 11 (the valves in lines 11a and 12 being closed) directly to product effluent line 25c from which it passes through exchanger 26, cooler 27, separator 28, and line 29 to the product recovery system for establishing operating conditions therein. If a single preheater is employed, naphtha charge is introduoced at this time to the separator through lines 8a and 8c, the valve in line 8b being closed. The pressure of the hot circulating nitrogen stream, if it is not already below about 200 p.s.i.g., should next be reduced to as low a pressure as is feasible, preferably to a pressure in the range of about 30 to 150 p.s.i.g., by adjustment of the pressure control valve in line 31.

The catalyst in one of the reactors is preferably heated to about 750° to 800° F. and the naphtha which is introduced into this reactor is preheated to about the same temperature so that the generation of hydrogen will largely be accomplished in a single vessel. When the swing reactor is employed for hydrogen generation and all catalyst beds have been heated to about 700° to 750° F. by circulating scrubbed flue gas, i.e. nitrogen, the valve in line 23 may be closed, the valve in line 23a being opened, and the temperature of heater 22 increased to provide a transfer line temperature of about 800° F. so that the swing reactor is thus heated to about 750° to 800° F. Next, with the pressure in the circulating nitrogen system below about 200 p.s.i.g. and preferably in the range of 30 to 150 p.s.i.g., the valves in lines 11a and 23 are opened, while valves in lines 11, 12 and 13a are closed, naptha vapors preheated to approximately 800° F. are introduced directly through lines 34 and 35 to the swing reactor while recycled gases are continuously circulated through heater 16, reactor 14, heater 18, reactor 20, heater 22 and reactors 24 and 36 (in parallel), the temperature of these heaters at this time being increased to bring the temperature of the lead and intermediate reactors up to about 800° to 850° F. The hydrogen generated by dehydrogenation in the swing reactor will quickly increase the hydrogen concentration of the recycled gas to about 80 percent or more and the pressure in the system may be increased by the generated hydrogen to the desired operating pressure. As soon as the circulating gas stream is at least about 80 percent hydrogen, the valve in line 12 is opened and the valve in line 11a is closed so that the charge preheated to about 800° F. is now cut into the hot circulating hydrogen stream. If and when regeneration of the catalyst in the swing reactor is desired, the valve in line 35 is closed and sufficient hot hydrogen is available for stripping hydrocarbons therefrom via lines 63, 40 and 35b, after which the valves in lines 63, 37, and 25a are closed. The transfer line temperatures of heaters 9, 16, 18 and 22 may now be increased to the desired level, e.g. about 900° to 920° F. and if the operating pressure has not already been attained, it may quickly be attained in this on-stream operation. Thus, carbon deposition on the lead, intermediate, and tail reactors is substantially avoided by starting up with hydrogen produced in the swing reactor.

By gradually increasing temperature and pressure during this startup procedure, the danger of encountering preliminary heat-fronts or hot-spots (apparently caused by undesired hydrocracking) may be avoided. Since gases are continuously being circulated through the reactors, reheaters and transfer lines while hydrogen is displacing nitrogen, there will be no abrupt temperature changes in any part of the system.

Instead of employing the swing reactor for initially generating hydrogen, the lead reactor, the tail reactor or in fact any of the on-stream reactors may be preheated to a temperature of about 750 to 800° F. by raising the temperature of the appropriate heater and the system may be brought on-stream by introducing charging stock at about 700° F. to all of the reactors except the preheated reactor for which the start-up inlet temperature is preferably about 750° to 800° F. With this method of start-up, line 11a is not required and the preheated naphtha may be introduced to line 13 and reactor 14 via transfer lines 10 and 12 when a separate preheater 9 is employed or may be introduced via lines 8a, 8b and 15 when hydrogen and naphtha are preheated in the same heating coil 16.

In this embodiment one reactor, e.g. the swing reactor, is preferably blocked out during the initial start-up and the inlet temperatures to the reactors which are at about 700° F. should not be increased until the hydrogen concentration in the recycled gas is at least about 80 percent. When the circulating nitrogen has thus been essentially replaced by hydrogen and the pressure of the recycled gas has been increased to at least about 200 p.s.i.g., all transfer line temperatures may be increased to the desired operating level and any further increase in pressure may be built up so that on-stream operating conditions are fully established. In this case, the reactor which was operated at the initially high temperature and in which most of the carbon deposition has occurred may be cut out of the system for regeneration and replaced by the reactor which was initially blocked out.

The method of effecting catalyst regeneration will be described as applied to the swing reactor but it should be understood that the same procedure may be employed for any one of the other reactors when it is blocked out. When the charge inlet valve in line 35 is closed and while the valve in line 37 remains open, hot hydrogen is introduced by line 63 to manifold line 40 and thence through line 35b to strip out any hydrocarbons that may remain in the reactor, this stripped material being discharged through lines 38 and 25a to line 25. Next, the valve in lines 63, 37, and 25a are closed and reactor 36 is depressured by opening the valve in line 41. Next, the reactor is purged to eliminate hydrogen therefrom by introducing flue gas from line 54, via lines 39 and 37b, the purge gases being vented through lines 35b, 40 and 41. The temperature of the catalyst bed is adjusted to about 650° to 750° F. preparatory to initiating regeneration by circulating flue gas, under approximately the same pressure as that employed in on-stream processes, i.e. about 300 p.s.i.g., through the reactor by circulator-compressor 50. Heat, if necessary, is supplied to the circulating gas by heater 53. Next, controlled amounts of air are introduced from source 60 by compressor 61 into the circulating flue gas stream at a rate to effect combustion of carbonaceous deposits without exceeding a combustion zone temperature of about 1050° F. The hot flue gas leaving the reactor at about this temperature passes by lines 35b, 40 and 56 through heat exchanger 52 and thence through line 45 to scrubber 46 wherein the gas is scrubbed with cool water for condensing and eliminating most of the water formed by combustion of hydrocarbonaceous deposits. The net amount of flue gas production is vented from the system through line 62, the valve in which is set to maintain the desired back pressure of about 300 p.s.i.g. The cooled flue gas which is recirculated by circulator 50 may be further dried by passing through a desiccant bed (not shown) before it is returned through heat exchanger 52 to heater 53 which, during regeneration, maintains a transfer line temperature of approximately 700° F.

The transfer line temperature of heater 53 is increased to about 950° F. in order to reheat the catalyst bed to that temperature. If rejuvenation is required (and it usually is not required until the catalyst has been regenerated many times) the introduction of flue gas is stopped and the introduction of air is continued so that the catalyst is treated with a circulating air stream at a pressure of about 300 p.s.i.g. and a temperature of about 950° F. or more for a period of about one-half hour to twelve hours or more depending upon the extent of rejuvenation required. For rejuvenation sufficient air must be added so that the partial pressure of the oxygen is at least 0.4 atmosphere.

After the regeneration (or after rejuvenation if rejuvenation has been effected) the introduction of air is stopped, and flue gas is introduced from source 42 to purge oxygen from the swing reactor and from the regeneration system via line 62 until the oxygen content is reduced below about 1 mol percent. After this high-pressure flue gas purge, the system is depressured by slowly opening the valve in line 41, and the purging operation may preferably be continued at atmospheric pressure to remove essentially all oxygen from the swing reactor and the regeneration system. After the flue gas purge, the flue gas may then be purged from the system with hydrogen-rich recycled gas introduced through lines 64, 39 and 37b. Preferably, to avoid heat front formation, the catalyst may be treated for 0.2 to 1 hour with a sulfur-containing non-reactive gas, e.g. methane containing 0.5 mol percent hydrogen sulfide, after the flue gas purge and prior to introducing hydrogen-rich recycled gas. The treating gas may be introduced from an outside source (not shown) into manifold 39 and thence to the swing reactor 36 via line 37b and vented via lines 35b, 40, and 41. After the recycled gas purge, the valve in line 37b is closed and the reactor is pressured with hot hydrogen introduced by lines 63, 40 and 35b. When the reactor is thus brought to desired operating pressure, the valves in lines 63 and 35b are closed and the reactor may be placed on-stream by opening valves in lines 35 and 37.

While our invention has been described as applied to a particular Ultraforming system, it should be understood that it is applicable to other types of regenerative platinum catalyst hydroforming systems in which the regeneration facilities include means for removing carbon oxides. Various alternative arrangements and operating conditions will be apparent from the above description to those skilled in the art.

Having thus described our invention, we claim:

1. The method of starting up a regenerative platinum catalyst naphtha hydroforming system including a reaction side comprising lead, intermediate, and tail reactors, said reactors being at temperatures below about 200° F. prior to startup, heating zones prior to each of said reactors, a gas separation zone after said reactors, and compressor and lines for recycling separated gas, and including a regeneration side comprising a source of flue gas for regeneration, a scrubbing zone wherein carbon oxides and water are removed from regeneration gases, a circulator and lines for circulating said flue gas through said scrubbing zone, and valved lines for connecting said regeneration side with said reaction side, which method comprises purging oxygen from said reaction side with flue gas introduced from said regeneration side, circulating flue gas continuously between said reaction side and said regeneration side so that carbon dioxide and water are removed therefrom in said scrubbing zone while simultaneously heating said circulating flue gas, isolating said reaction side from said regeneration side and recycling scrubbed flue gas through said reaction side, introducing preheated naphtha charge stock at a temperature in the range of 700° to 800° F. into one of said reactors while the pressure of the recycled scrubbed flue gas is in the range of about 30 to 200 p.s.i.g., continuing the introduction of naphtha charge stock at a temperature in said range until the hydrogen concentration in hydrogen-enriched recycled gas reaches about 80%, and then increasing the temperature of the naphtha charge to at least about 850° F.

2. The method of claim 1 wherein flue gas is circulated continuously between said reaction side and said regeneration side until the carbon oxide content of the circulating flue gas is reduced below about 1 mol per cent when the temperature thereof is at least about 450° to 500° F.

3. The method of claim 2 which includes the steps of heating said recycled scrubbed flue gas in said heating zones to a temperature of about 700° to 750° F., cooling the recycled scrubbed flue gas leaving said tail reactor to condense water therefrom, and separating water from the recycled scrubbed flue gas in said gas separation zone prior to introducing naphtha into said reaction side.

4. The method of claim 1 which includes the step of initially introducing preheated naphtha charge stock into a reactor which is at a higher temperature than the remaining reactors.

5. The method of claim 1 which includes the step of simultaneously increasing the pressure of the recycled gas while the hydrogen concentration thereof is being increased.

6. The method of claim 1 wherein flue gas is circulated continuously between said reaction side and said regeneration side at a temperature of about 700° to 750° F. until the carbon dioxide content of the circulating flue gas is reduced below about 1 mol percent and the water content of the circulating gases is reduced below about 5 mol percent.

7. In a regenerative platinum catalyst naphtha hydroforming system including a reaction side comprising multiple reactors, said reactors being at temperatures below about 200° F. prior to startup, heating zones prior to each reactor, a gas separation zone, a compressor and lines for recycling separated gas, and including a regeneration side comprising a source of flue gas, a contacting zone wherein carbon oxides are removed from contacted gases, a circulator and lines for circulating gases, and valved lines for connecting the regeneration side and the reaction side, the method of start-up which comprises purging said reaction side and said regeneration side with flue gas, circulating flue gas through said reaction side and said contacting zone while increasing reactor temperatures to at least about 450° to 500° F., isolating said reaction side from said regeneration side, recycling contacted flue gas through said reaction side at a temperature of about 700° to 750° F., introducing preheated naphtha charge into said reaction side at a temperature in the range of about 750° to 800° F. and at an initial pressure below normal operating pressure whereby dehydrogenation of naphtha is effected and the hydrogen concentration in the recycled gas is increased, and increasing the temperature of the introduced naphtha to at least about 850° F. in all of the on-stream reactors after sufficient hydrogen has been built up in the recycled gas to substantially prevent carbon formation on the catalyst.

8. The method of claim 7 wherein the carbon oxides content of contacted gases is reduced below about 0.5 mol percent and the water content is reduced below about 1 mol percent prior to introduction of preheated naphtha.

9. The method of claim 7 wherein said contacting zone is a water spray tower.

10. The method of claim 7 in which the reaction side contains a swing reactor, which method includes the steps of initially passing preheated naphtha only through the swing reactor for providing a hydrogen build-up in the system and subsequently blocking out said swing reactor and regenerating catalyst therein.

References Cited in the file of this patent

UNITED STATES PATENTS

| | | |
|---|---|---|
| 2,284,603 | Belchetz et al. | May 26, 1942 |
| 2,335,610 | Plummer | Nov. 30, 1943 |
| 2,643,214 | Hartwig | June 23, 1953 |
| 2,654,694 | Berger et al. | Oct. 6, 1953 |
| 2,749,287 | Kirshenbaum | June 5, 1956 |
| 2,759,876 | Teter et al. | Aug. 21, 1956 |
| 2,773,013 | Wolf et al. | Dec. 4, 1956 |
| 2,773,014 | Snuggs et al. | Dec. 4, 1956 |
| 2,792,337 | Engel | May 14, 1957 |

UNITED STATES PATENT OFFICE
CERTIFICATE OF CORRECTION

Patent No. 2,880,161                            March 31, 1959

Thomas M. Moore et al.

It is hereby certified that error appears in the printed specification of the above numbered patent requiring correction and that the said Letters Patent should read as corrected below.

Column 10, line 23, for "compressing" read -- comprising --.

Signed and sealed this 28th day of June 1960.

(SEAL)
Attest:

KARL H. AXLINE                            ROBERT C. WATSON
Attesting Officer                       Commissioner of Patents